R. E. ZELLERS.
CORN-PLANTERS.
No. 180,695.
4 Sheets—Sheet 4.
Patented Aug. 1, 1876.
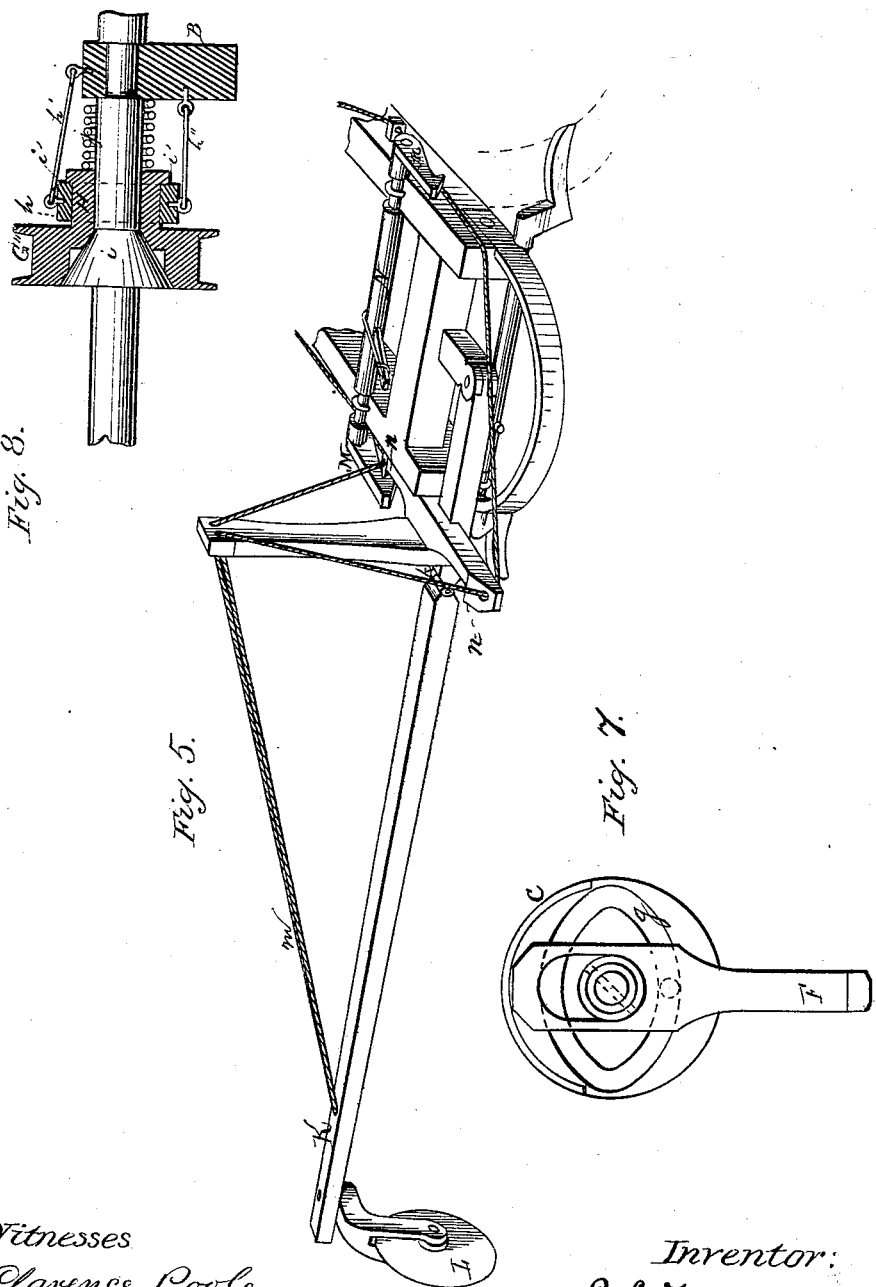
Witnesses
C. Clarence Poole
C. K. Evans
Inventor:
R. E. Zellers
by his attys.
A. K. Evans & Co.

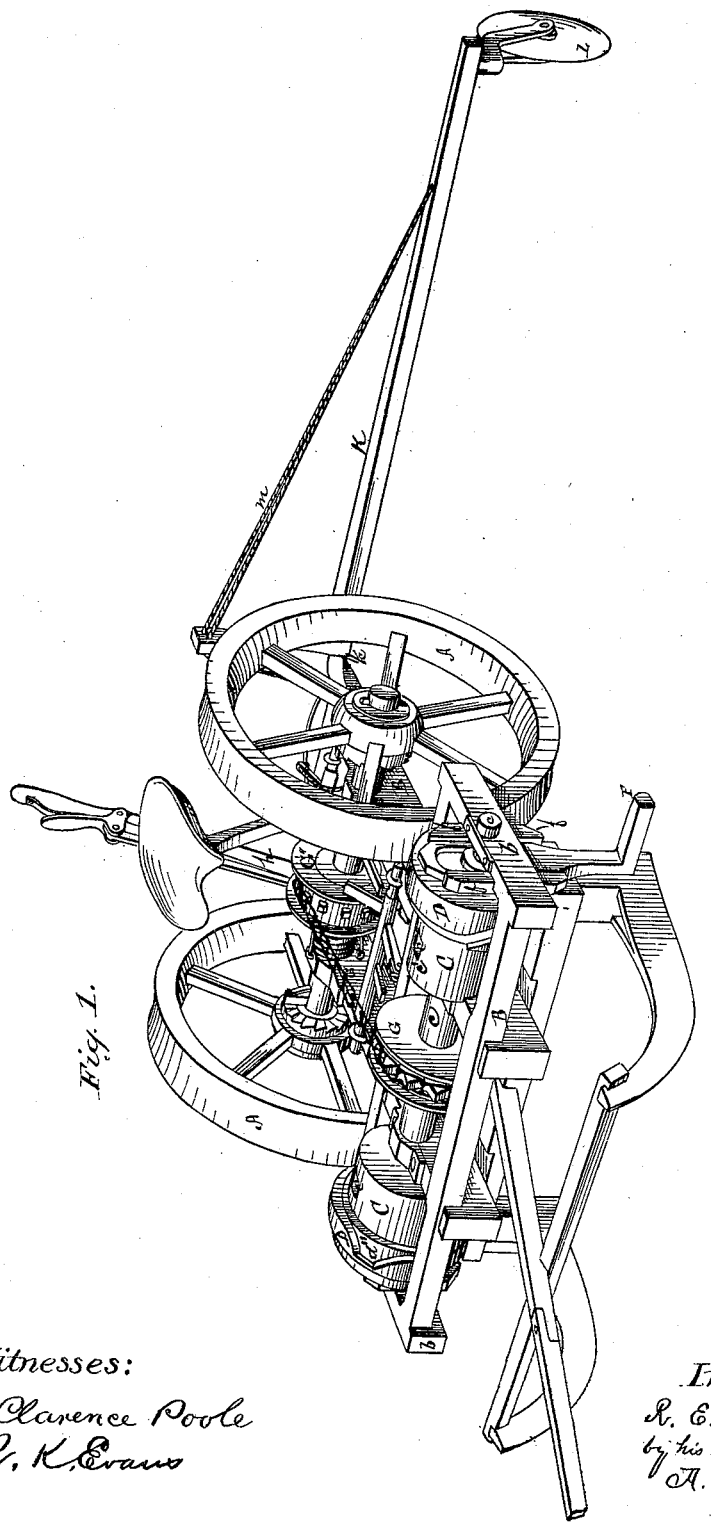

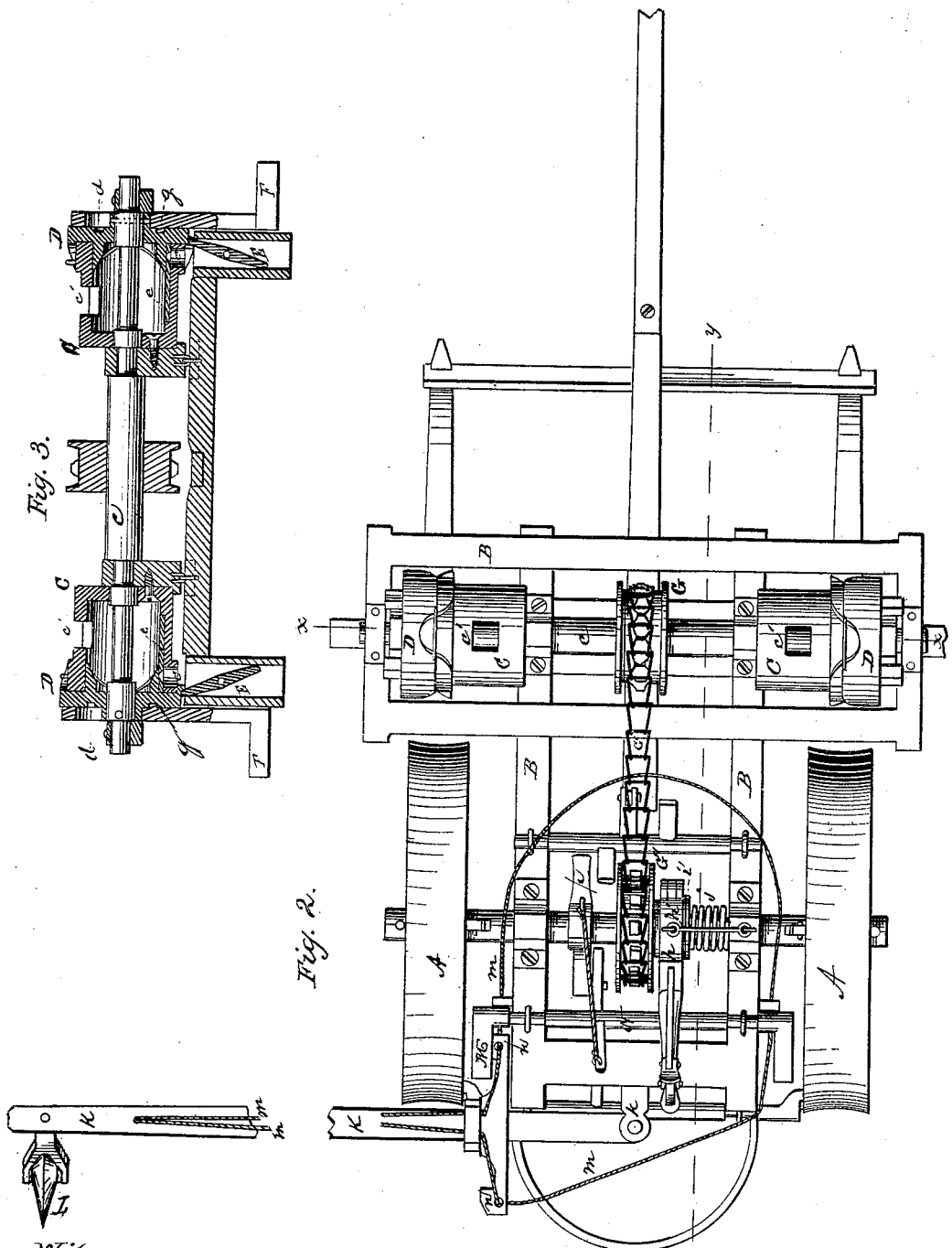

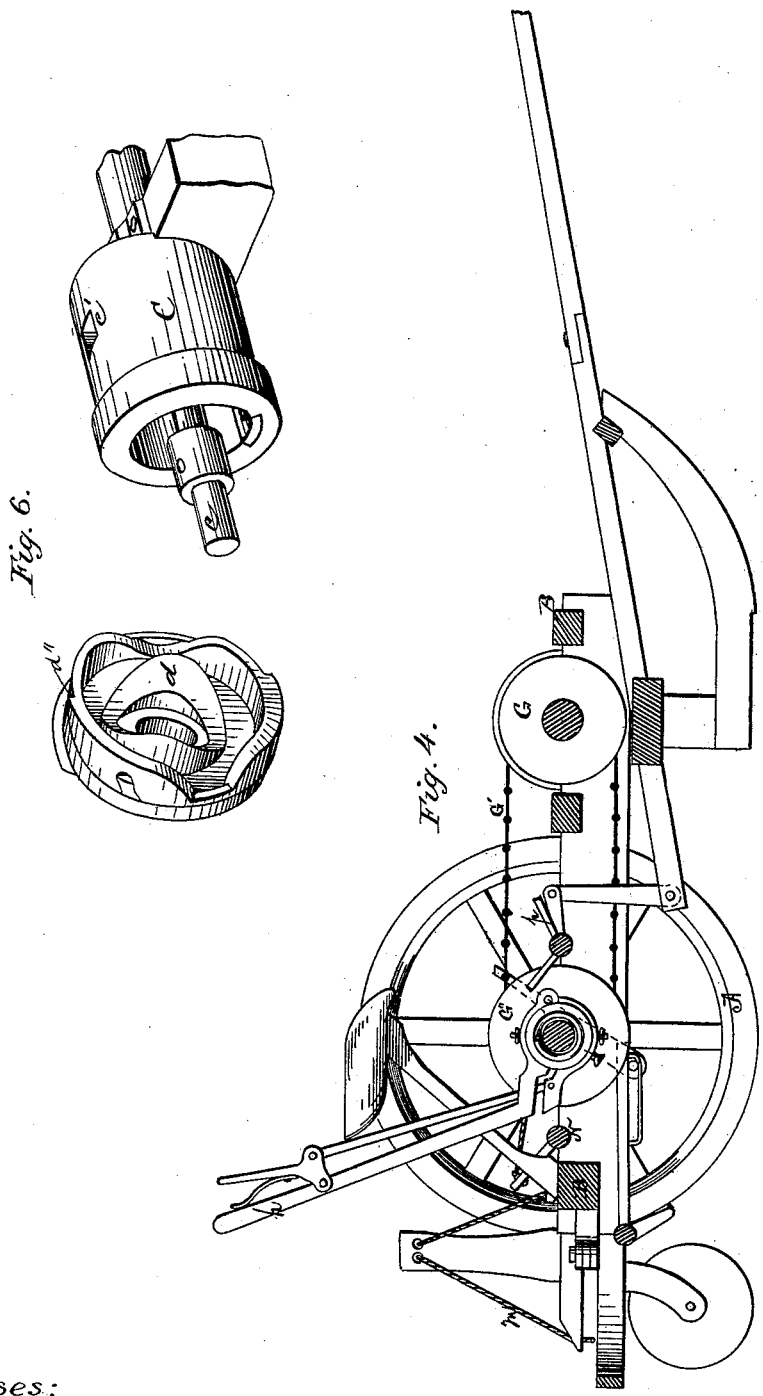

UNITED STATES PATENT OFFICE.

ROBERT E. ZELLERS, OF PATTERSON, IOWA.

IMPROVEMENT IN CORN-PLANTERS.

Specification forming part of Letters Patent No. 180,695, dated August 1, 1876; application filed May 31, 1876.

*To all whom it may concern:*

Be it known that I, ROBERT E. ZELLERS, of Patterson, Iowa, have invented certain new and useful Improvements in Corn-Planters, of which the following is a full, clear, and exact description, reference being had to the accompanying drawings, making a part of this specification, in which—

Figure 1 is a perspective view of my invention. Fig. 2 is a plan or top view of same with seat removed. Fig. 3 is a vertical section through the line $x\ x$ of Fig. 2, (through the cylinders.) Fig. 4 is a vertical section through the line $y\ y$ of Fig. 2. Fig. 5 shows the marker-gearing in perspective; Fig. 6, views of the outer and inner cylinder; Fig. 7, view of plunger detached from cylinder; Fig. 8, details, to be referred to.

My invention relates to that class of wheel corn-planters from which grains are automatically dropped as the machine moves forward; and it consists, first, in the novel devices for dropping the grain; secondly, in plungers for marking the grain; and, thirdly, in the construction and arrangement of the marker for the rows.

To enable others skilled in the art to make and use my invention, I will proceed to describe the exact manner in which I have carried it out.

In the drawings, A A are the bearing-wheels, and B B the frame-work. C C are two stationary hollow cylinders, through which passes the shaft $c$, having its bearings in the frame-work and outer beams $b\ b$. Secured to each end of the shaft $c$ is a short cylinder or cap, D, inclosing the outer end of each of the stationary cylinders, and rigidly attached to the inside head of each cap is another smaller cam-shaped cylinder, $d$, fitting loosely within the stationary cylinder C, the cap D and smaller cylinder $d$ revolving with and upon the shaft $c$. The stationary hollow cylinder C is provided with an opening, $c'$, on the top for the introduction of the seed-corn, and with a small hole, $c''$, at the bottom, through which to discharge the seed to the valve E, through which it passes to the earth and is planted. The hole $c''$ is controlled or regulated by a slide, $e$, which may be operated by any convenient means. Around the outer surface of the cap D is a winding or cam groove, $d''$, into which fits the top of the valve E. This cam-groove is so arranged that it opens and closes the valve twice during each revolution of the cap. When the notch in the small cylinder $d$ passes over the hole $c''$ in the bottom of the large cylinder C the desired number of grains of corn or other seed drops through the hole $c''$ to the valve E. The continued revolution of the cylinder $d$ then closes the hole $c''$, and the cam-groove $d''$ causes the valve E to open and allow the grain to fall before the opposite notch of the cylinder $d$ reaches its position over the hole $c''$ ready to discharge another fixed number of grains. On the outside head of the cap D is an oval cam-groove, $g$, in which plays a pin attached to the plunger F, and by which the plunger, moving between the vertical guides $f\ f$, is caused to rise and fall as the cap D revolves. This plunger is caused to descend just as the grain passes out of the planter, and thus marks the spot at which the corn has fallen to the earth. The shaft $c$ receives its motion through a sprocket-wheel, G, and link-belt G', connecting with a similar wheel, G'', on the main axle of the machine. This latter wheel works on a cone-shaped bearing, $i$, by means of which it can be readily thrown out or in gear with the wheel G, and thus the planting devices before mentioned are easily controlled and regulated by the driver on his seat. The wheel G'' has an elongated hub, H, provided with a shoulder, $i'$, against which bears the side of the lever $h$. The lever itself is connected with the frame-work B by the two links $h'\ h''$. Between the shoulder $i'$ and the frame B is interposed a spiral spring, $j$, to hold the wheel G'' on its conical bearing, where it gears with a pin on the cone, and is forced to revolve with the axle of the machine, and, consequently, operate the wheel G and the planting devices. By throwing the lever H forward, which the driver on his seat can readily do, it is caused, by the links $h'\ h''$, to move toward the side of the machine, and, pressing against the shoulder $i^1$ on the elongated hub of the wheel, the wheel itself is moved with the lever and from its conical bearing, by which means it is also ungeared from the axle of the machine, and ceases to revolve, thereby arresting the operations of the planting devices. When the lever H is again drawn back the spring $j$ throws the wheel G″ again into gear with the axle. In the rear of my planter I arrange a marker, K, for the rows, so that it will swing from side to side, as desired. It is also hinge-jointed at $k$, to enable the driver, by means of the cords $m$ $m$, to raise the wheel L and swing the marker to the opposite side. When the marker is in position for service it is caught and held in place by the latch M hooking over the catch $n$. One of these catches I place on each side of the marker, adapted to a corresponding latch. The latches are rigidly attached to the outer end of a shaft, N, having its bearings in the frame B, and placed at a point convenient to the driver's feet. An arm extending from this shaft N connects with a lever, $p$, operated by the foot of the driver, who, when he wishes to release the marker with a view to changing its position, has only to bear down the lever $p$, which raises the latches and releases the marker. The same lever which operates the latches operates the scrapers.

Having thus described my invention, what I claim as new, and desire to secure by Letters Patent, is—

1. In a corn-planter, the stationary cylinder C, provided with the openings $c'$ $c''$ and cap D, in combination with the cylinder $d$ and valve E, substantially as and for the purpose set forth.

2. The cap D, provided with the cam-groove $d''$, in combination with the valve E, substantially as described.

3. The cap D, provided with the oval cam-groove $g$, in combination with the plunger F, substantially as and for the purpose set forth.

4. The cylinders C and $d$, cap D, shaft $c$, and wheel G, in combination with the endless chain G′ and wheel G″, substantially as and for the purpose set forth.

5. The wheel G″, having an elongated hub, $h$, provided with a shoulder, $i'$, in combination with the conical bearing $i$, lever H, spring $j$, endless chain G′, and cylinder C, substantially as and for the purpose set forth.

6. The marker K, constructed as described, in combination with the cords $m$ $m$, latches M, shaft N, and lever $p$, substantially as and for the purpose set forth.

ROBERT EMANUEL ZELLERS.

Witnesses:
ZENAS LEONARD,
BUTLER BIRD.